P. CARROLL.
AUTOMATIC AIR VENT.
APPLICATION FILED JAN. 25, 1919.
1,336,280.
Patented Apr. 6, 1920.
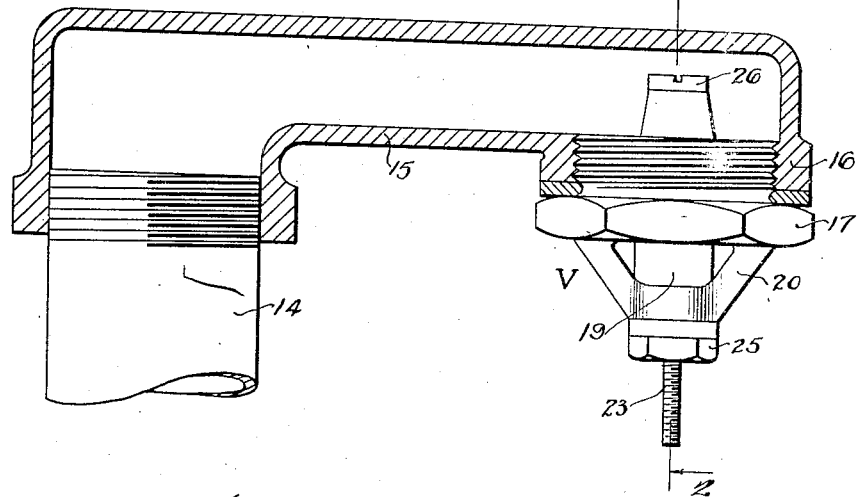
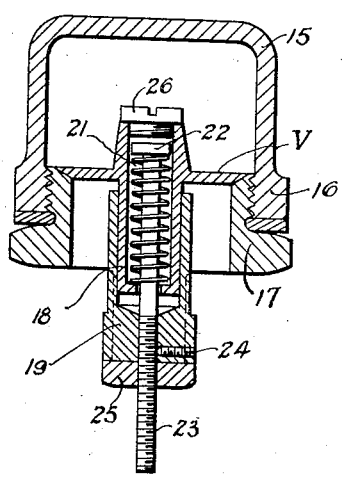
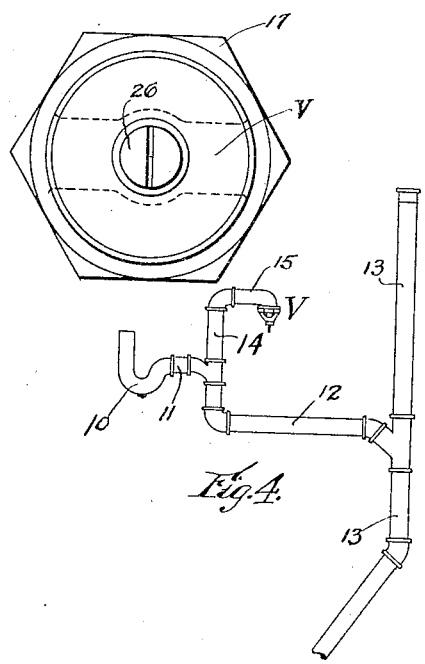
WITNESSES
INVENTOR
Patrick Carroll,
BY
ATTORNEYS

UNITED STATES PATENT OFFICE.

PATRICK CARROLL, OF NEW YORK, N. Y.

AUTOMATIC AIR-VENT.

1,336,280.   Specification of Letters Patent.   Patented Apr. 6, 1920.

Application filed January 25, 1919. Serial No. 273,111.

*To all whom it may concern:*

Be it known that I, PATRICK CARROLL, a citizen of the United States, and a resident of the city of New York, Long Island City, borough of Queens, in the county of Queens and State of New York, have invented a new and Improved Automatic Air-Vent, of which the following is a full, clear, and exact description.

This invention relates to house plumbing devices and has particular reference to means for preventing the undesired siphoning of a trap by reason of the downflow through the main pipe of the system.

Among the objects of the invention is to provide a device of the character indicated which will serve to prevent such siphonage, without the employment of a continuous vent pipe, such vent pipe being objectionable for various reasons, including unnecessary expense and unsightly appearance.

Another object of the invention is to provide an attachment for a trap which may be attached at any time either during the construction of the building or later and without marring or disfiguring the building, and which will be functional for the purpose indicated for an indefinite length of time.

A still further object is to provide an attachment which will not collect water of condensation, or the like and which therefore can never freeze, and which furthermore will not trap and hold a quantity of air to become foul, the air being changed in the attachment at every automatic action thereof.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a vertical longitudinal section of a tubular arm connecting the automatic valve to the crown of the trap.

Fig. 2 is a vertical transverse section of the same and the valve on the line 2—2 of Fig. 1.

Fig. 3 is a plan view of the valve separated from the arm.

Fig. 4 is a diagram indicating the location and manner of use of my invention in connection with a portion of the main discharge or soil pipe.

Referring now more specifically to the drawings, 10 is a trap for a toilet bowl, sink, or the like, the crown of which is indicated at 11. 12 is a connection between the trap and soil pipe 13 which may obviously be of any desired elevation or vertical length for the discharge from traps or fixtures in any of the floors of the building and through which such deliveries are made to the main outlet or sewer.

In the usual practice of house plumbing it is sometimes customary to employ a continuous vent pipe leading upward from the crown 11 in order to prevent the discharge through the soil pipe, acting as a piston, from siphoning the water out of the trap 10. In order to avoid this unnecessary or objectionable vent pipe which must lead upward through the building to some point higher than the upper end of the soil pipe and into communication with the atmosphere, I employ a short riser 14, the height of which need not be much above the overflow point of the fixture, said riser being attached at any convenient place along the crown 11 of the trap. A short horizontal pipe or arm 15 is connected to the upper end of the riser and is provided with a downwardly directed opening 16 into which is fitted a valve seat 17.

I do not wish to be limited in the use of any specific form or type of valve except that it shall be of a suitable structure for free upward opening movement for the admission of fresh air into and through the arm 15, and thereafter to automatically seat and close itself upon the seat 17. In Figs. 1, 2 and 3 I indicate a valve V comprising a tubular shank 18 guided for vertical reciprocations in a fixed tubular guide 19 held by a bracket 20 to the valve seat structure 17. This guiding means for the valve insures the proper seating thereof either by gravity or by gravity in connection with the action of a spring 21 located within the shank and thereby well protected from corrosion or other deteriorating conditions. The lower end of the spring bears against the inturned end of the shank while the upper shank bears against the head 22 of a screw 23 vertically adjustable in the lower end of the guide 19. This adjustment of the screw may be fixed either by a set screw 24 or a lock nut 25. The spring and screw are introduced into the valve shank through an opening at the upper end of the valve which is thereafter closed by a plug 26. The rim of the valve is so developed or constructed as to seat with certainty, making an absolute air tight joint so as to prevent the leakage of air upward from the riser and through the arm 15 above the trap, but the valve will be free to unseat itself upward by reason of the suction from the soil pipe at every downflow therethrough in connection with the normal atmospheric pressure acting upward through the valve seat and against the under surface of the valve. The valve and valve seat are preferably ground to make an air tight joint.

In view of the foregoing specific description the manner of operation will be readily appreciated. The action of the trap 10 is as usual, the same being adapted to retain a sufficient quantity of water in the vent thereof to prevent the escape of foul gases in the building. The riser and valve structure above the crown 11 of the trap will contain only air. At every downflow through the soil pipe 13 the suction of the flow therethrough will act, not through the trap 10 discharging the water therefrom, but inward through the valve lifting the valve momentarily from its seat and thence through the arm 15, riser 14, and trap connection 12. Thus it will be seen that the air in the riser and arm will never become stagnant since a fresh supply of air is introduced thereinto at every downflow through the soil pipe.

I claim:

The herein described automatic air vent comprising a casing having an open bottom, a valve seat screwed upward into the casing through said open bottom, said valve seat having a hollow center and including a rigid bracket as a part thereof, a vertically arranged tubular guide supported centrally of the valve seat and upon said bracket, said guide having a threaded lower end, a valve seated upon said valve seat and adapted to open upward within the casing, said valve including a downwardly projecting hollow shank slidable in the guide and having an inturned lower end, a threaded pin having a head within the valve structure and extending thence downward through the center of the inturned end and adjusted in and through the threaded end of the guide, and a coil spring surrounding the pin and located between the inturned end of the shank and the head of the pin and serving to resiliently hold the valve seated.

PATRICK CARROLL.